R. W. WALKER.
SUPPORT AND SHIFTER FOR DRIVING BELTS.
APPLICATION FILED MAY 6, 1909.
972,955.
Patented Oct. 18, 1910.
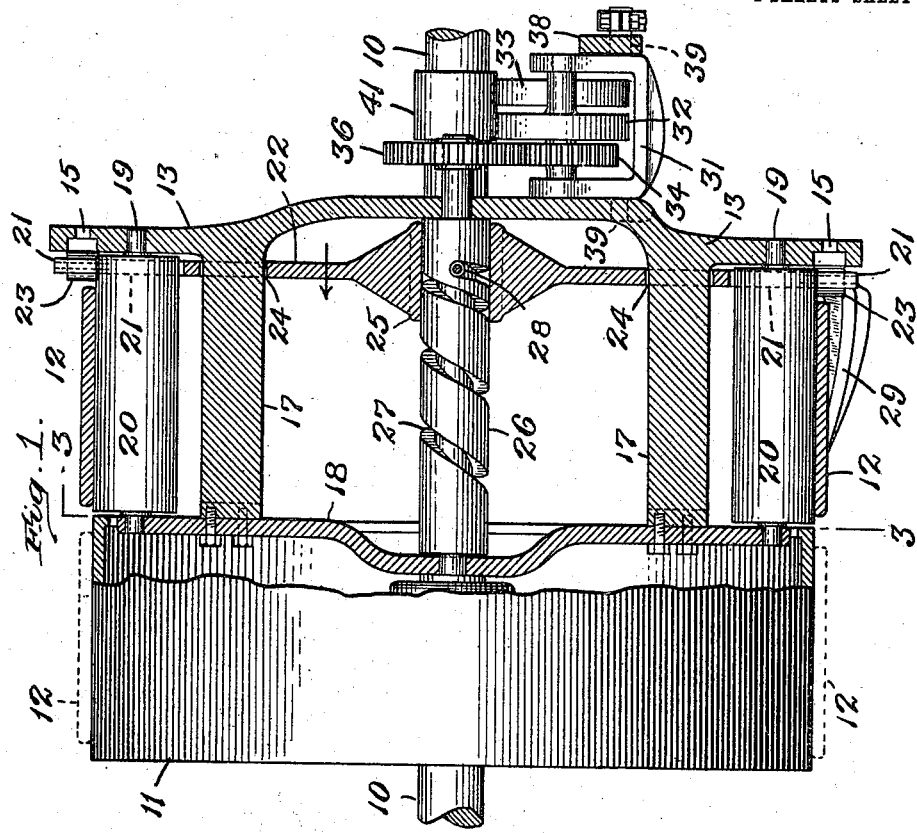
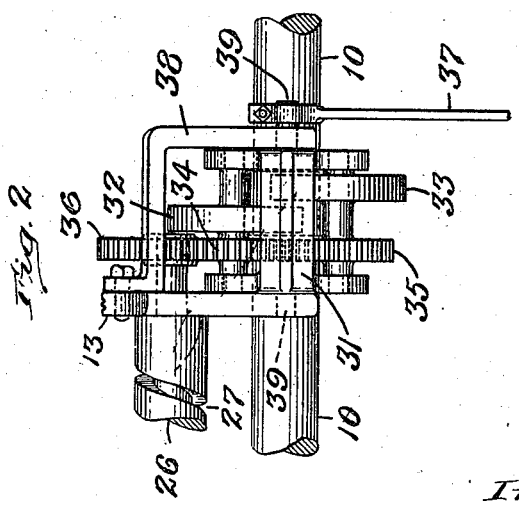

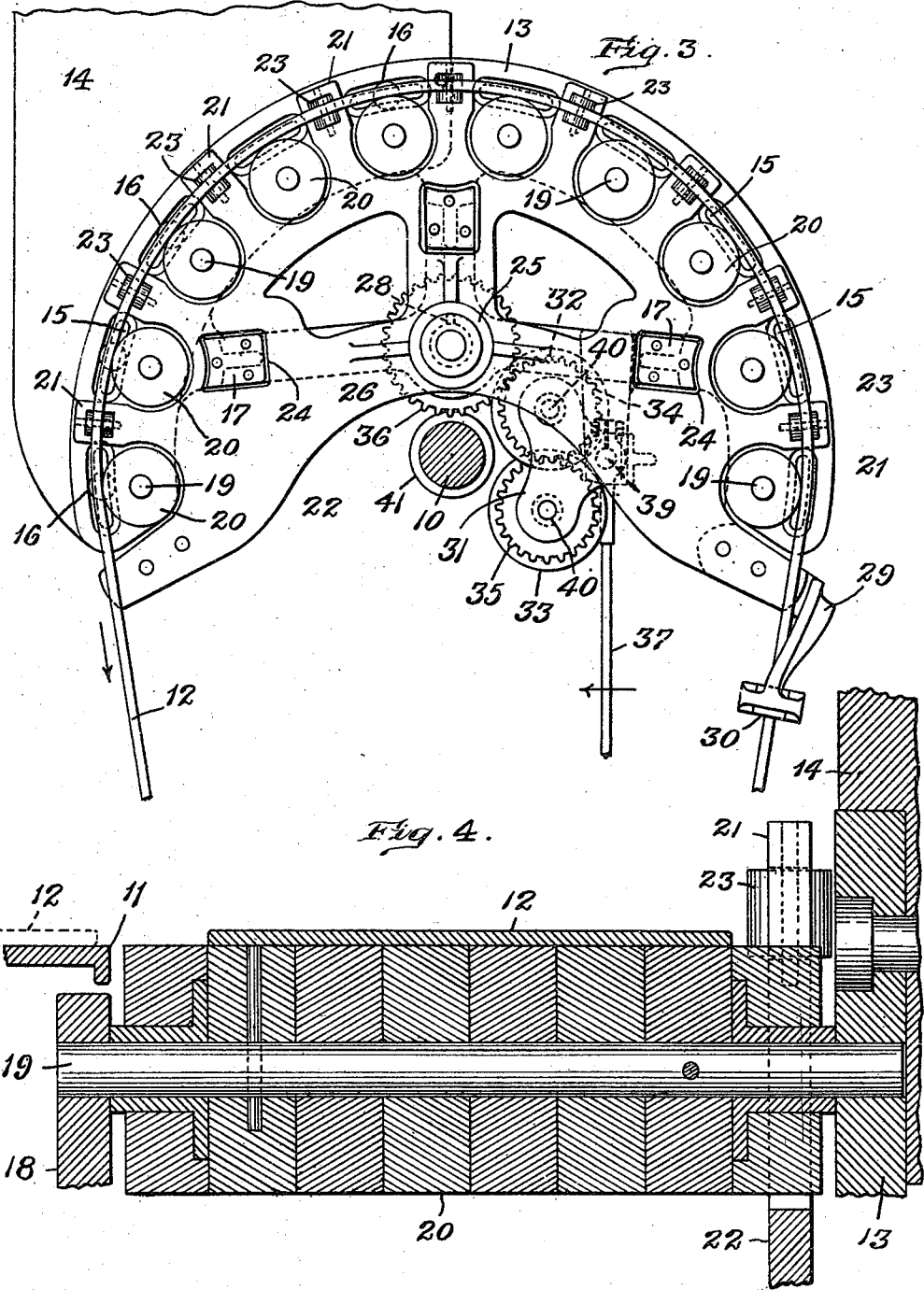

UNITED STATES PATENT OFFICE.

RODOLPHUS W. WALKER, OF LAWRENCE, MASSACHUSETTS.

SUPPORT AND SHIFTER FOR DRIVING-BELTS.

972,955.
Specification of Letters Patent.
Patented Oct. 18, 1910.

Application filed May 6, 1909. Serial No. 494,497.

*To all whom it may concern:*

Be it known that I, RODOLPHUS W. WALKER, of Lawrence, in the county of Essex and State of Massachusetts, have invented certain new and useful Improvements in Supports and Shifters for Driving-Belts, of which the following is a specification.

This invention relates to belt and pulley driving mechanism and means for shifting the belt to and from the pulley.

A driving shaft and a driven shaft which are connected by a belt are, in the majority of instances, disconnected when it is desired to stop the rotation of the driven shaft. The means most commonly employed for so disconnecting the driven shaft is a loose pulley arranged on one of the shafts at the side of the tight pulley. When it is desired to provide a loose pulley for so disconnecting the driven shaft, the loose pulley is usually mounted upon the driven shaft and the face of the driving pulley is sufficiently broad to be equal to the aggregate width of the tight and loose pulleys on the driven shaft. In order to shift the belt laterally from the tight to the loose pulley and vice versa, a shipper is usually provided for engaging the edges of the belt, the shipper being manually operative. The purpose of mounting the loose pulley upon the driven shaft is to enable the belt to be driven continuously by the driving shaft in all cases whether the belt be upon the tight or loose pulley of the driven shaft. One reason for driving the belt continuously is to facilitate the shifting thereof from one pulley to another, this shifting requiring more power and imposing greater wear upon the belt if the pulleys are so arranged that the belt ceases to move when it is shifted to its idle pulley. The latter state of affairs is the result of arranging the tight and loose pulleys upon the driving shaft and providing the driven shaft with a relatively broad pulley. One result of providing either of the shafts with an idle pulley is that, when the belt is placed thereon, the driving shaft is nevertheless subjected to the weight of the belt and the consequent friction tending to retard its rotation. In shops having a great number of belt driving shafts with tight and loose pulleys, it frequently happens that a great number of belts are idle at the same time and that the source of power is thereby unduly taxed inasmuch as the belts are not working but are merely a dead load.

One object of the present invention is to provide a support in place of a loose pulley, said support to be arranged at one side of a tight pulley on the driving shaft and supported independently of the shaft and adapted to receive the belt from the pulley so that, when the belt is removed from the pulley, the driving shaft is thereby entirely relieved of the weight and consequently the friction of the belt. In this way, the source of power is not called upon to overcome the friction of idle parts.

Another object of the invention is to provide a shipper of novel construction for moving the belt back and forth from the pulley to the stationary support. The shipper in order to avoid the objectionable wear upon the belt when the motion thereof is discontinued, as already explained, is formed with a series of radiating fingers each provided with an anti-friction roll, said rolls being arranged to engage one edge of the belt at a plurality of points, and thereby move all portions of the belt toward the pulley in unison.

The invention is further characterized by driving mechanism adapted to be actuated by the continuously revolving shaft for actuating the shipper in either direction, said mechanism being manually controllable and normally inoperative.

Of the accompanying drawings which illustrate one form in which the invention may be embodied, Figure 1 is a transverse section and partial plan view of a driving pulley, a stationary support for a belt, and means for transferring the belt. Fig. 2 is a side elevation of the driving mechanism for transferring the belt. Fig. 3 is a section on line 3—3 of Fig. 1. Fig. 4 is a longitudinal section on a larger scale of a belt-supporting roll of which the stationary support is provided with a series.

The same reference characters indicate the same parts in all the figures.

On the drawings 10 represents a shaft, presumably a driving shaft, driven continuously in one direction. 11 represents a pulley affixed thereon and 12 represents a belt adapted to be driven by the pulley.

In carrying out the invention a support is arranged at one side of the pulley for the purpose of receiving the belt when it is desired to discontinue the use thereof. A suitable support is indicated at 13 and is adjustably clamped, or otherwise secured, to a suitable bracket or other fixture 14 supported independently of the shaft. The support 13 is of semicircular formation, as indicated by Fig. 3, and is adapted to be arranged in concentric relation to the shaft 10. It is furthermore adapted to be set at various positions about the axis of the shaft, and for this purpose, it is formed with a series of segmental slots 15 adapted to receive bolts 16 by which it is attached to the bracket 14. The support is not only adapted to be adjusted to various positions within the range of the slots, but is adapted to be further adjusted by removing the bolts from one set of slots and turning the support about the shaft so that other slots may register with the holes provided in the bracket for the bolts and so that the bolts may be inserted in other slots. By reason of providing this means of changing the position of the support 13, it is adapted to be employed at any angle according to the inclination of the belt which it is to receive.

The support is provided with stationary arms 17 which extend toward the pulley and which support a semicircular plate 18 at their outer ends. The support 13 and plate 18 are provided with apertures which constitute bearings for spindles 19 carrying belt-supporting rolls 20. The axes of the spindles are parallel to the axis of the shaft 10 and the series of rolls is arranged in an arc coinciding with the rim of the pulley so that they are adapted to receive the belt from the pulley and support it in the same relative position so that it may be freely shifted back and forth.

The rolls 20 are sufficiently separated from each other to provide spaces which are occupied by a series of radiating fingers formed upon a belt shipper of palmate form. The shipper is at the outer edge of the belt and the fingers 21 are each provided with an antifriction roll 23, said rolls being adapted to simultaneously engage one edge of the belt when it is upon the supporting rolls 20 and move the belt to the pulley. The arms 17 formed upon the support 13, extend through apertures 24 formed in the shipper and furnish suitable bearings upon which the shipper may slide. The shipper is further provided with a hub 25 which is adapted to slide upon a shaft 26 of which one end is journaled in the support 13 and the other end in the plate 18. The shaft 26 is formed with a helical groove 27 and constitutes a screw actuator for moving the shipper back and forth. For this purpose the interior of the hub 25 is provided with a stud 28 extending into the groove 27.

It is apparent that rotation of the actuator 26 in one direction will move the shipper toward the pulley and that rotation in the opposite direction will move the shipper away from the pulley. In order that the movement away from the pulley may cause the removal of the belt from the pulley, the shipper is provided with an arm 29 which overhangs the outer face of the belt and which is provided with an antifriction roll 30 adapted to engage the edge of the belt which is not engaged by the rolls 23. It will be observed that the groove 27 in the actuator 26 is not of uniform lead, but that at one end the lead is relatively slight and that it increases as it advances toward the other end. By so forming the groove, the initial movement of the actuator in moving in the direction of the arrow from the position shown by Fig. 1, is relatively slow and requires relatively slight power for turning the actuator. As the shipper advances and the belt engages the pulley, the lead of the groove 27 increases thereby accelerating the movement of the shipper so as to place the belt upon the pulley without unnecessary delay, thereby giving the pulley the benefit of the full width of the belt in order to carry it up to speed.

Although the means herein shown and described for supporting the belt when it is removed from the pulley, is entirely independent of the shaft 10, I provide means adapted to be manually controlled but operated by the shaft for turning the actuator 26 in either direction. Said means includes a yoke or hanger 31, friction rolls 32, 33, gears 34, 35 and 36, and a hand lever 37. The hanger 31, as shown by Figs. 1 and 2, is mounted between the support 13 and a bracket 38 attached thereto. The hanger is adapted to swing about trunnions 39 to one of which the hand lever 37 is clamped, and it supports the ends of studs 40 upon which the friction rolls 32 and 33 are respectively affixed. The gear 34 is affixed to the roll 32 and the gear 35 is affixed to the roll 33, said gears being arranged in coöperative relation with each other, while the gear 34 is also in coöperative relation with the gear 36 which is affixed upon one end of the actuator shaft 26. The rolls 32 and 33 are adapted to be moved into frictional engagement with the shaft 10 when the hanger 31 is oscillated in one direction or the other by means of the hand lever. The shaft may, if desired, be formed or provided with a collar 41 for the purpose of engaging and driving the rolls 32 and 33.

Referring now to Fig. 3, if the hand lever be moved in the direction indicated by the arrow, the roll 33 is thereby placed in coöperative engagement with the shaft 10 and rotation of the latter is transmitted through the gears 35 and 34 to the gear 36, which is on the actuator 26. On the other hand, if the hand lever be moved in the opposite direction, the roll 32 is moved into engagement with the shaft 10 and the actuator 26 is turned in the opposite direction due to the arrangement of the gears. The hand lever is adapted to be clamped in various positions about its trunnion 39 so that it may hang perpendicularly regardless of whatever position the support 13 occupies about the shaft 10. The rolls 32 and 33 are so arranged that they cannot both engage the shaft 10 at the same time, and when the hand lever is clamped in the position shown, it is adapted to normally position the hanger 31 so that the rolls are both retracted from the shaft. It will be observed that the axes of the actuator 26, the gear 34 and the pivot stud 39 are approximately in alinement and consequently the relatively slight movement of the roll 32 and gear 34 toward and from the shaft 10 are not sufficient to materially disturb the intermeshed relation of the gear 34 with the gear 36 when the hanger is moved.

I claim:—

1. The combination with a shaft, pulley, and belt, of a support independent of said members, a plurality of belt receiving rolls mounted on said support in a curved series at one side of the pulley so that their outer portions lie in an arc corresponding to the periphery of the pulley, and a belt shipper having belt-engaging fingers arranged to engage the belt near the points where the tangent stretches of the belt are merged with the bight, and fingers arranged to engage the bight of the belt intermediately of said first mentioned fingers.

2. The combination with a shaft, pulley and belt, of a series of rolls supported independently of the shaft and at one side of the pulley in an arc corresponding to the periphery of the pulley, and a palmate belt shipper likewise supported independently of the shaft and having fingers each between two of said rolls.

3. The combination with a shaft, pulley and belt, of a support for the belt at one side of the pulley, a shipper for the belt, a screw actuator for the shipper, a manually movable hanger, a pair of rolls journaled in said hanger and adapted to engage the shaft one at a time, a pair of coöperating gears connecting said rolls, and a gear on said actuator in coöperative relation with one of the gears of said pair of gears.

In testimony whereof I have affixed my signature, in presence of two witnesses.

RODOLPHUS W. WALKER.

Witnesses:
W. P. ABELL,
P. W. PEZZETTI.